A. L. CHANDLER.
TUBE WRAPPING LATHE.
APPLICATION FILED FEB. 15, 1922.
1,432,531.
Patented Oct. 17, 1922.
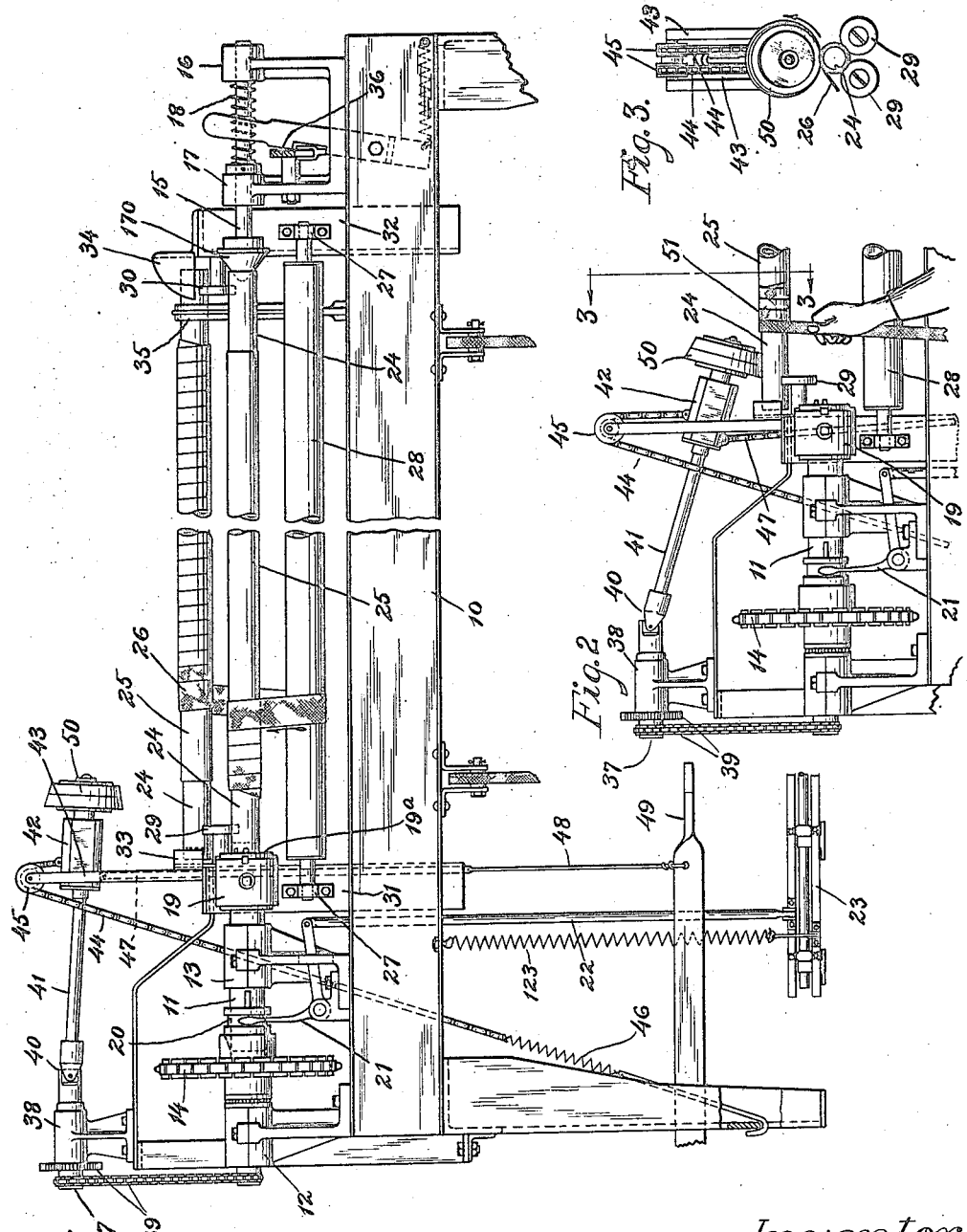
Inventor
Albert L. Chandler.
By Robert M. Pierson
Atty.

Patented Oct. 17, 1922.

1,432,531

UNITED STATES PATENT OFFICE.

ALBERT L. CHANDLER, OF AKRON, OHIO, ASSIGNOR TO THE B. F. GOODRICH COMPANY, OF NEW YORK, N. Y., A CORPORATION OF NEW YORK.

TUBE-WRAPPING LATHE.

Application filed February 15, 1922. Serial No. 536,754.

*To all whom it may concern:*

Be it known that I, ALBERT L. CHANDLER, a citizen of the United States, residing at Akron, in the county of Summit and State of Ohio, have invented a certain new and useful Tube-Wrapping Lathe, of which the following is a specification.

This invention relates to machines for applying a temporary fabric wrapping to a rubber or other plastic tube mounted upon a mandrel, and at the same time unwrapping the strip from a similar tube to which it has previously been applied. Such machines are used in the manufacture of inner tubes for pneumatic tires from a wide sheet of gum which is rolled upon itself upon the mandrel to make a laminated raw tube in straight form, said tube being vulcanized on the mandrel and then stripped off, and having its ends joined to make an endless tube. It is customary to apply a helical fabric wrapping throughout the length of the raw tube for the purpose of squeezing out the air, then to remove the mandrel with the wrapped tube thereon from the machine, send it along a return guide-way to allow time for the compression to become fully effective, meanwhile substituting a fresh mandrel and tube and applying thereto the wrapper which is removed from the mandrel at the head of the series of wrapped tubes and mandrels in the return guide-way. After the main wrapper is removed from this returned tube, short end-wrappers are wound helically on the ends of said tube and left on during the vulcanizing operation to bevel or "skive" the tube ends for the purpose of making a lapped splice when the ends are joined.

In the application of these short end-wrappers it has heretofore been necessary to remove the mandrel from the idle rollers which support it during the unwrapping operation and place it between the live and tail spindles of the lathe in order to rotate the mandrel while the end-wrappers are being applied. The object of my invention is to avoid the necessity for this operation, and to that end I provide an auxiliary mandrel-rotating means for driving the mandrel while supported on the idle rollers, thus saving the time and labor heretofore required in making the transfer to the main lathe centers.

Of the accompanying drawings, Fig. 1 is a side elevation of a tube-wrapping lathe constructed according to my invention.

Fig. 2 is a side elevation of the live end showing the auxiliary drive in operation.

Fig. 3 is a section on the line 3—3 of Fig. 2.

In the drawings, 10 is the frame of the lathe, 11 is the live spindle mounted in bearings 12, 13 and driven by a chain running over a sprocket wheel 14 whose hub loosely surrounds the spindle, and 15 is the tail spindle mounted in bearings 16, 17 and having a conical tail center 170 adapted to seat in one end of the hollow mandrel and held yieldingly against the mandrel by a spring 18 which surrounds the tail-shaft between the bearings. The live spindle has a chuck 19 for gripping the other end of the mandrel by means of a face-plate 19ª having suitable centering and driving projections which enter holes in an end-piece fastened in the mandrel. 20 is a sliding collar splined on the live spindle and having a cone-clutch member adapted to engage a complemental clutch member formed on the hub of the sprocket wheel 14. This collar is retracted by means of a bell-crank lever 21 connecting through a link 22 with the rear end of a treadle 23, whose front end is normally elevated by a spring 123, so that the drive is disconnected except when the operator steps on the treadle. Two of the mandrels 24 are shown in place in the machine in Fig. 1, with raw tubes 25 thereon. 26 is the main fabric binding strip, of which there are used a number corresponding to the number of mandrels going through the machine, these strips being used repeatedly until worn out.

In bearings 27, underneath the axis of the spindles 11, 15, is loosely journaled a guide-roller 28, around which the wrapped tube passes in being unwound from the upper or delivering mandrel onto the lower or receiving one.

The upper mandrel is loosely supported on two pairs of idle rollers 29, 30, journaled on the standards 31, 32 which support the bearings 27 and other parts, and suitable guards 33, 34 are provided to keep said upper mandrel from jumping out of place. At the tail end of the machine there is provided a pair of brake-jaws 35, of which one is shown in Fig. 1, which are manually opened and closed to admit and release the upper mandrel by suitable mechanism, partly shown in Fig. 1, and including a hand-lever 36, the purpose of these brake-jaws being to impose a light friction on the upper mandrel to keep it from overrunning.

The auxiliary drive for rotating the upper mandrel includes a counter-shaft 37 mounted in a bearing 38 supported over the live spindle and driven from the outer end of the latter through suitable chain and spur gearing 39. The shaft 37 connects through a universal joint 40 with an angularly adjustable shaft 41 mounted in a forward bearing 42 which slides between upright guides 43 on the lathe frame, said bearing being elevated by a pair of chains 44 which pass over a double pulley 45 and connect with an anchored spring 46. For depressing the bearing 42, there is provided a chain 47 connecting through a link-rod 48 with a treadle 49. To the free end of the shaft 41 is secured a cone-wheel 50 provided with a suitable friction surface such as leather, and adapted when in its lowest position to bear against the upper mandrel 24, as shown in Figs. 2 and 3. This view also illustrates the application of the narrow fabric tape or binding strip 51 at one end of the tube 25 for compressing said tube, to bevel the same during vulcanization.

A lathe of this type is preferably operated by two attendants. A fresh mandrel 24 with a raw tube 25 thereon is mounted between the tail center 170 and the chuck 19 and engaged with the driving projections on the end of the face-plate 19ª. Another mandrel 24 with a wrapped tube thereon is taken from the head of the series in the return guide (which is omitted from the illustration as it forms no part of my invention) and located on the idle rollers 29, 30 between the guards 33, 34, the brake-jaws 35 being spread by means of the hand-lever 36 to admit this mandrel. The end of the wrapping strip 26 from the upper or delivering mandrel is then unwound by hand, passed under and around the roller 28, and applied to the lower or receiving mandrel adjacent to the end of the bare tube thereon. The operator then steps on the treadle 23 to shift the collar 20 leftward to the position indicated in Fig. 1 and engage the cone clutch members so that the constantly rotating sprocket-wheel 14 will drive the live spindle 11, thereby rotating the receiving mandrel and wrapping the strip 26 helically thereon, while at the same time unwrapping it at an equal rate from the upper mandrel. When the strip has all been wound onto the lower mandrel, its end is secured and the wrapped mandrel and tube are removed from between the spindles 11, 15, and rolled onto the return guide. The narrow end-tapes 51 are then applied to the exposed tube 25 on the upper mandrel and guided by the operator's hand, as illustrated in Fig. 2, while said mandrel is rotated by bringing the friction driving roller 50 down into contact therewith through the depression of the treadle 49, the treadle 23 being meanwhile depressed in order that the live spindle shall be driven from the sprocket-wheel 14 and its motion communicated through the chain and spur gearing 39 on the counter-shaft 37 and the adjustable shaft 41. The two ends having been taped, the upper mandrel and tube are then removed from the lathe and carried to the vulcanizer, the lathe being then ready to repeat the foregoing operation on another pair of mandrels.

It will be obvious that various changes may be made in the specific form of embodiment without departing from the scope of my invention.

I claim:

1. In a tube-wrapping lathe, the combination of means for supporting and rotating a receiving mandrel, means for idly supporting a delivering mandrel, an auxiliary drive for rotating said delivering mandrel, and means for bringing said auxiliary drive into and out of action.

2. In a tube-wrapping lathe, the combination of means for supporting and rotating a receiving mandrel, means for idly supporting a delivering mandrel parallel thereto, a friction driving wheel for engaging the side of said delivering mandrel to rotate it, and means for moving said friction wheel into and out of operative position.

3. In a tube-wrapping lathe, the combination of aligned live and tail spindles for rotatably supporting and driving a receiving mandrel, two sets of idle rollers for rotatably supporting a delivering mandrel parallel thereto, a friction driving wheel mounted for side engagement with one end of the delivering mandrel, and means for laterally shifting said friction wheel.

4. In a tube-wrapping lathe, the combination of a delivering mandrel, means for supporting the same for normal free rotation, a conical friction wheel mounted for side engagement with said mandrel, and an angularly adjustable driving shaft for rotating said friction wheel.

5. In a tube-wrapping lathe, the combination of means for supporting and rotating a receiving mandrel, means for supporting a delivering mandrel for normal free rotation, parallel with the receiving mandrel, an auxiliary driving device including a drive shaft and a friction wheel adapted to rotate said delivering mandrel by side engagement therewith, and means for moving said device angularly into and out of its driving position.

6. In a tube-wrapping lathe, the combination of means for horizontally supporting a pair of mandrels, one above the other, means rotating the lower mandrel, and means located above the upper mandrel and movable into and out of side engagement therewith for frictionally driving said mandrel.

7. In a tube-wrapping lathe, the combination of aligned live and tail spindles for rotatably supporting and driving a receiving mandrel, means for supporting a delivering mandrel parallel thereto, in normal free rotation, a parallel roller for guiding in a traveling loop the wrapping strip between said mandrels, and means movable into and out of engagement with said delivering mandrel for frictionally rotating the same by side contact therewith.

8. In a tube-wrapping lathe, the combination of means for horizontally supporting and rotating a lower mandrel, means for horizontally supporting an upper mandrel in normal free rotation, a countershaft located above the upper mandrel, an angularly-movable shaft universally connected therewith and having a laterally-shiftable forward bearing, a vertical guide for said bearing, and a conical friction wheel on said angularly-movable shaft adapted to be brought into side contact with the upper mandrel by the depression of said bearing.

In witness whereof I have hereunto set my hand this 13 day of February, 1922.

ALBERT L. CHANDLER.